Dec. 14, 1954 J. W. TATTER Re. 23,911

ATTACHMENT FOR PAINT CANS

Original Filed April 22, 1949

Inventor

JOHN W. TATTER

By Hawes & Hartley

Attorneys

United States Patent Office

Re. 23,911
Reissued Dec. 14, 1954

23,911

ATTACHMENT FOR PAINT CANS

John W. Tatter, Akron, Ohio

Original No. 2,648,460, dated August 11, 1953, Serial No. 88,962, April 22, 1949. Application for reissue August 10, 1954, Serial No. 449,033

3 Claims. (Cl. 220—90)

Matter enclosed in heavy brackets [ ] appears in the original patent but forms no part of this reissue specification; matter printed in italics indicates the additions made by reissue.

My invention relates to improvements in attachments for paint cans particularly adapted for wiping excess paint from a paint brush.

A principal object of the present invention is to generally improve and simplify the construction of paint brush wiping means of the type adapted to be removably attached to a paint can.

An important object of the invention is to provide a brush wiping means of the character referred to of such construction and material as to eliminate certain disadvantages residing in such devices heretofore known.

Another important object is to provide means for wiping excess paint from a paint brush that functions as well on a full can of paint as upon a can from which paint has been used.

A further object is to provide a paint brush wiping device so constructed that paint wiped from a brush will fall within the can on which the device is attached and will not smear the can.

Still another object of the invention is to provide a paint brush wiping device adapted to wipe a brush on both sides and edges by only two strokes of the brush.

Yet another object is to provide removable paint wiping means for a paint can which means may be readily applied and removed from a paint can, easily cleaned, and when not in use, will occupy a small amount of space.

Yet another object is to provide a device of the character referred to above wherein the operations of manufacturers involve simple bending operations.

Yet still another object is to so form the device that substantially its entire length is sprung when the device is attached to a can, thereby avoiding localized distortion.

The foregoing and other objects and advantages of the invention will be made apparent as the specification proceeds.

Reference is now made to the accompanying drawing wherein.

Figure 3:
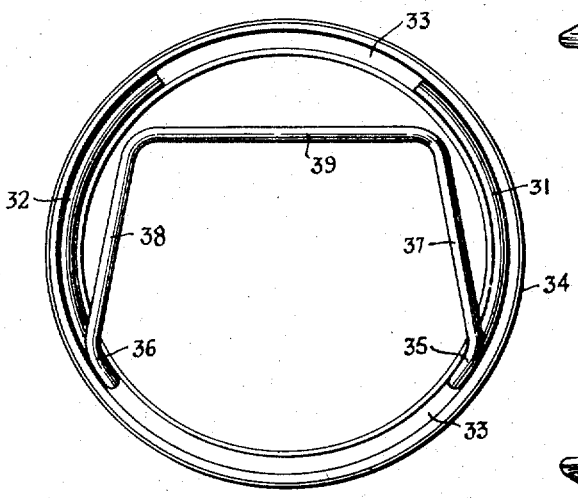
Fig. 3 is the same as Fig. 1, except the device is shown in operative position attached to the top of an open paint can of the friction lid type.
Figure 1:
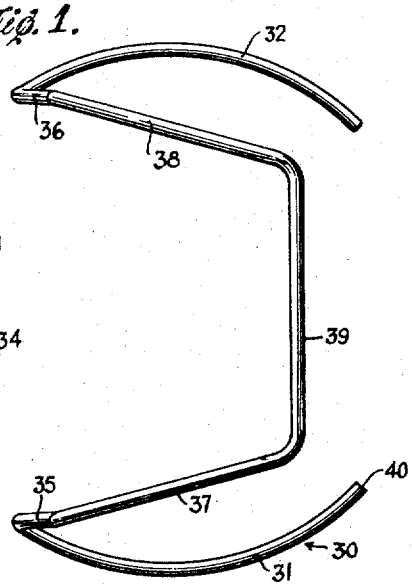
Fig. 1 is a top plan view of a form of the invention.
Figure 4:
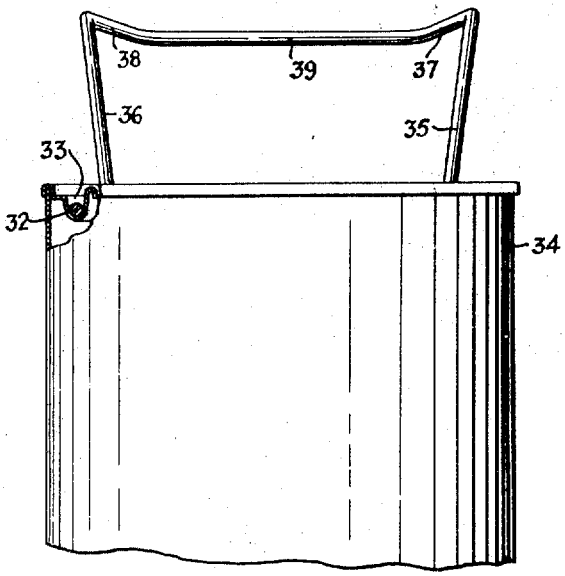
Fig. 4 is an elevation of the can of Fig. 3 partially broken away to show the relative position of the base of the device and the sides of the groove of the can.

An embodiment of the invention is shown in Figs. 1 to 4 and the device is so formed that it may be manufactured by extremely simple bending operations. In this embodiment half hard galvanized wire may be used and the device referred to generally as 30 comprises similar arcuate base portions 31 and 32 lying in the same plane. The combined length of said base portions constitute approximately 180° of a circle. These base portions 31 and 32 are adapted to be sprung inwardly and buttoned or snapped into a lid groove 33 of a paint can 34 and to anchor therein by frictional contact with the radially outer side of groove 33 (Fig. 4). From base portions 31 and 32 uprising arms 35 and 36 respectively extend a substantial distance, as for example, 1½" and then turn at slightly less than a 90° angle into side arms 37 and 38. Arms 37 and 38 extend from 35 and 36 respectively in a converging direction a distance sufficient to reach points substantially approximately over the free ends of the bases 31 and 32 and a substantial height thereabove, said height being not less than one quarter the diameter of said lid groove 33. As indicated, arms 35 and 36 turn into arms 37 and 38. These latter arms lie in a plane that slopes toward the plane of the base portions 31 and 32. The arms 37 and 38 are joined at their ends remote from arms 35 and 36 by a horizontally extending principal wiping member 39, it being understood that those portions of arms 37 and 38 adjacent to member 39 are also wiping members adapted to remove excess paint from the bristles on the edge of a paint brush.

Figure 2:
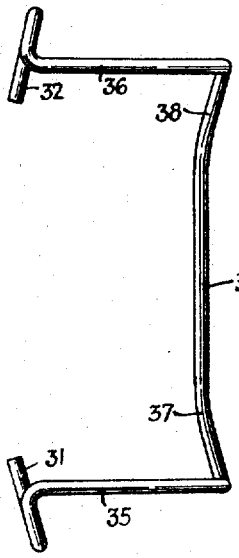
Fig. 2 is an elevation of the device of Fig. 1 taken from the front closed side thereof.

By reference to Fig. 2 it will be seen that arms 35 and 36 are parallel in their unsprung condition.

The device 30 is applied to a paint can of the pressed on lid type by first removing the can lid and then manually springing the device inwardly at its base and inserting the base into the groove 33 of the can. This may be conveniently done by first placing an end 40 of the base 31 in groove 33 and then with the lower portion of arms 35 and 36 held between the index finger and the thumb of the right hand, exerting pressure to spring those portions toward each other which permits base 31 and that portion of base 32 adjacent to arm 36 to drop into groove 33 where they are held by the right hand while the end 41 of base 32 is pressed inwardly by the left hand and snapped into groove 33. This completes the attachment of the device 30 to the can. Upon release of the device from the pressure of the hands the bases 31 and 32 press firmly against the radially outer wall of the groove 33 and frictionally anchor the device in operative position.

It will now be seen that in entering the groove 33 that the bases 31 and 32 were sprung and also that arms 35 and 36 moved from their parallel relation (see Fig. 2) to a drawn-in non-parallel relation (see Fig. 4). Similarly arms 37 and 38 are sprung toward each other, which latter movement will place a spring tension in cross member 39. Since the necessary compression movement to spring the device 30 enough to insert the bases in the groove involves the entire length of wire composing said device, no localized stress occurs in the wire and its life and efficiency will be unimpaired by long use.

While only one embodiment of the invention has been illustrated and described in detail herein, it is to be understood that the invention is not limited to the specific example set forth since modifications may be resorted to within the scope of the appended claims.

What is claimed is:

1. In a device of the class described composed of a continuous length of galvanized half hard steel wire comprising two diametrically opposed arcuate base portions lying in the same plane and together forming approximately 180° of a circle, an arm raised from the end of each base *portion*, said arms being normally substantially parallel, each said arm turning back over the plane of said base[s] *portions* at less than a 90° angle and merging into a side arm which side arms extend a distance to points approximately three quarters of the way back over *the plane of* said base[s] *portions*, said side arms being connected by a cross member which lies in a plane parallel to the plane of said base[s] *portions* and being spaced therefrom a distance equal to not less than one quarter of the diameter of a circle of which said arcuate base portions are segments.

2. In a device of the class described consisting of a continuous length of [galvanized half hard steel] wire comprising diametrically opposed arcuate base portions contained in substantially the same plane and forming an open gap at one end of said base portions, the other ends of said base portions being connected by an integral continuous vertical and transversely extending bridge portion, the vertical portions of said bridge extending substantially perpendicular to the plane of said base portions and parallel to each other, the said transversely extending portion integrally connecting the upper extremities of said vertical portions, and comprising a substantially U-shaped portion in plan disposed in a plane extending substantially parallel to the plane of the base portions, the side arms of said U-shaped portion extending *approximately* three quarters of the way back over said base portions, said side arms of said U-shaped bridge portion and said vertical portions being disposed to fall entirely within a cylinder formed by projecting the side of the base portions at a right angle to the plane of said base portions.

*3. In a device of the class described composed of a continuous length of wire comprising two diametrically opposed arcuate base portions lying in the same plane and together forming approximately 180° of a circle, an arm raised from the end of each base portion, said arms being normally substantially parallel, each said arm turning back over the plane of said base portions at less than a 90° angle and merging into a side arm which side arms extend a portion of the way back over the plane of said base portions, said side arms being connected by a cross member which lies in a plane parallel to the plane of the base portions and being spaced therefrom a distance equal to not less than approximately one quarter of the diameter of a circle of which said arcuate base portions are segments.*

References Cited in the file of this patent or the original patent

UNITED STATES PATENTS

| Number | Name | Date |
|---|---|---|
| 1,220,531 | Nehr | Mar. 27, 1917 |
| 1,865,736 | Astley | July 5, 1932 |
| 1,972,861 | Baillie | Sept. 11, 1934 |
| 1,994,335 | Churan | Mar. 12, 1935 |
| 2,219,617 | Brougham | Oct. 29, 1940 |
| 2,321,492 | Kinney | June 8, 1943 |
| 2,466,850 | Hoffman et al. | Apr. 12, 1949 |